(12) United States Patent
Brockerhoff

(10) Patent No.: US 9,520,613 B2
(45) Date of Patent: Dec. 13, 2016

(54) BATTERY CONTROL WITH BLOCK SELECTION

(71) Applicant: Infineon Technologies AG, Neubiberg (DE)

(72) Inventor: Philip Georg Brockerhoff, Munich (DE)

(73) Assignee: Infineon Technologies AG, Neubiberg (DE)

( * ) Notice: Subject to any disclaimer, the term of this patent is extended or adjusted under 35 U.S.C. 154(b) by 446 days.

(21) Appl. No.: 13/949,178

(22) Filed: Jul. 23, 2013

(65) Prior Publication Data
US 2015/0028817 A1    Jan. 29, 2015

(51) Int. Cl.
*H02J 7/00* (2006.01)
*H01M 10/02* (2006.01)
*H01M 10/44* (2006.01)
*H01M 10/48* (2006.01)
*H02J 7/34* (2006.01)

(52) U.S. Cl.
CPC ........... *H01M 10/02* (2013.01); *H01M 10/441* (2013.01); *H02J 7/0013* (2013.01); *H02J 7/0019* (2013.01); *H01M 10/48* (2013.01); *H01M 10/482* (2013.01); *H02J 7/345* (2013.01); *Y02T 10/7055* (2013.01)

(58) Field of Classification Search
CPC .... H01M 10/02; H01M 10/441; H01M 10/48; H01M 10/482; H02J 7/0013; H02J 7/0019; H02J 7/345; Y02T 10/7055
See application file for complete search history.

(56) References Cited

U.S. PATENT DOCUMENTS

| | | | |
|---|---|---|---|
| 2001/0035735 A1* | 11/2001 | Fukuoka et al. | 320/112 |
| 2009/0250275 A1* | 10/2009 | Yoshida | 180/65.22 |
| 2012/0013304 A1* | 1/2012 | Murase et al. | 320/116 |
| 2012/0091964 A1* | 4/2012 | Vance et al. | 320/122 |
| 2012/0133329 A1* | 5/2012 | Yoshida et al. | 320/116 |
| 2012/0242156 A1 | 9/2012 | Butzmann et al. | |

FOREIGN PATENT DOCUMENTS

| | | |
|---|---|---|
| CN | 102457083 A | 5/2012 |
| DE | 10 2011 077 701 A1 | 12/2012 |
| WO | WO 2011/023529 A2 | 3/2011 |
| WO | 2012091402 A2 | 7/2012 |

* cited by examiner

*Primary Examiner* — Nha Nguyen
(74) *Attorney, Agent, or Firm* — Slater Matsil, LLP

(57) ABSTRACT

A battery block is equipped with a plurality of battery blocks. Each of the battery blocks includes at least one battery cell to provide a block voltage of the battery block. A first number of the battery blocks is selected, and the first number of the battery blocks is coupled to voltage terminals of the battery to set a battery voltage which corresponds to the sum of the block voltages of the first number of battery blocks. Further, a second number of the battery blocks is selected, and the second number of battery blocks is coupled to the voltage terminals of the battery to set a battery voltage which corresponds to the sum of the block voltages of the second number of battery blocks.

22 Claims, 11 Drawing Sheets

BATTERY CONTROL WITH BLOCK SELECTION

TECHNICAL FIELD

The present application relates to control of a battery and to corresponding devices and methods.

BACKGROUND

In order to provide batteries having a certain output voltage, it is known to use a plurality of battery cells connected in series. The voltages of the individual battery cells then sum up to the total output of the battery.

In some applications, a rather large number of battery cells are required to achieve the desired output voltage level. For example, in the case of vehicle batteries used in the automotive field, e.g., for electric vehicles or hybrid vehicles, output voltages in the range of 350 V may be needed. For this purpose, about 100 Lithium-ion battery cells, each having a nominal cell voltage of about 3.5 V may be connected in series.

However, the actual cell voltage of a Lithium-ion battery cells may vary considerably depending on the charging state of the battery cell. For example, the cell voltage may be about 4.0 V at full charge and decrease to about 2.5 V at 30% charge. In the above-mentioned example of a battery formed of 100 battery cells, this would correspond to a variation of the output voltage between 400 V and 250 V.

Such voltage variations of a battery may be addressed by appropriate design and dimensioning of other components, e.g., an electric motor of the vehicle or inverter for supplying the electric motor. On one hand, the components need to be capable of handling the maximum output voltage of the battery at full battery charge. On the other hand, the components also need to be capable of handling the increased current flow if the maximum output power is used at low battery charge and thus reduced output voltage of the battery. Such dimensioning and design requirements typically result in increased manufacturing costs. Also, the overall efficiency may be reduced. For example, semiconductor components which have sufficiently high breakthrough voltages for the maximum output voltage of the battery may at the same time have increased losses as compared to semiconductor components with lower breakthrough voltages, which may result in a loss of efficiency.

The problem of varying output voltage may also be addressed by using a DC-DC converter to stabilize the output voltage. However, such a DC-DC converter would need to be dimensioned for the maximum output voltage of the battery, which again may involve considerable costs. Further, usage of a DC-DC converter adds complexity to the battery system and may result in increased costs.

Accordingly there is a need for techniques which allow for efficient battery usage.

SUMMARY OF THE INVENTION

According to an embodiment of the invention, a method of controlling a battery block is provided. The battery block comprises a plurality of battery blocks. Each of the battery blocks comprises at least one battery cell to provide a block voltage of the battery block. According to the method, a first number of the battery blocks is selected, and the first number of the battery blocks is coupled to voltage terminals of the battery to set a battery voltage which corresponds to the sum of the block voltages of the first number of battery blocks. Further, a second number of the battery blocks is selected, and the second number of battery blocks is coupled to the voltage terminals of the battery to set a battery voltage which corresponds to the sum of the block voltages of the second number of battery blocks.

BRIEF DESCRIPTION OF THE DRAWINGS

According to further embodiments of the invention, other methods, devices, or systems may be provided. Such embodiments will be apparent from the following detailed description in connection with the accompanying drawings.

DETAILED DESCRIPTION OF ILLUSTRATIVE EMBODIMENTS

Figure 1A:
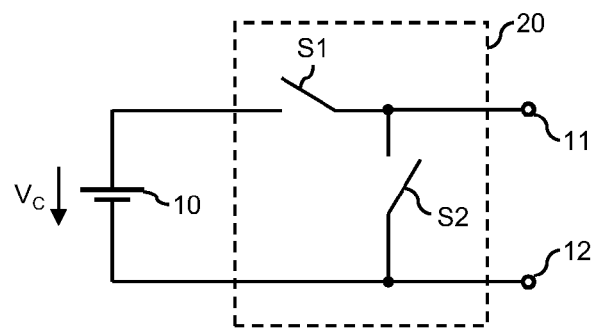
FIGS. 1A, 1B and 1C schematically illustrate a battery block according to an embodiment of the invention.

In the following, various embodiments will be described in detail with reference to the accompanying drawings. It should be noted that these embodiments serve only as examples and are not to be construed as limiting. For example, while embodiments with a plurality of features, other embodiments may comprise less features and/or alternative features. Furthermore, features from different embodiments may be combined with each other unless specifically noted otherwise.

Embodiments as illustrated in the following relate to control of a battery which is equipped with a plurality of battery cells. For example, the battery cells may be implemented as Lithium-ion battery cells. However, other types of battery cells could be used as well. In the illustrated implementations, the battery is organized in a plurality of battery blocks, each including one or more of the battery cells to provide a block voltage of the battery block.

Control of the battery may specifically involve selecting a first number, or group, of the battery blocks and coupling the first number of the battery blocks to voltage terminals of the battery to set a battery voltage which corresponds to the sum of the block voltages of the first number of battery blocks. Further, control of the battery may involve selecting a second number, or group, of the battery blocks and coupling the second number of battery blocks to the voltage terminals of the battery to set a battery voltage which corresponds to the sum of the block voltages of the second number of battery blocks. Typically, the first number of battery blocks and the second number of battery blocks differ with respect to at least one battery block. That is to say, at least one battery block of the first number is not included in the second number or at least one battery block of the second number is not included in the first number. In this way, the battery voltage may be efficiently adjusted by selection of battery blocks. The battery voltage produced by the selected battery blocks may be applied to an electrical device connected to the voltage terminals of the battery. Alternatively, the selected battery blocks may be charged by applying a charging voltage to the voltage terminals of the battery. In each case, the selection allows for adapting the battery to the current operating conditions.

The selection of the battery blocks may be based on various criteria. For example, the battery voltage after coupling the first number of battery blocks to the voltage terminals may be detected, and the selection of the second number of battery blocks may be performed depending on the detected battery voltage. For this purpose, the detected battery voltage may be compared to a threshold value, and in response to the determined battery voltage being below the threshold value, the second number of battery blocks may be selected to be higher than the first number of the battery blocks. Similarly, in response to the determined battery voltage being above a threshold value, the second number of battery blocks may be selected to be lower than the first number of the battery blocks.

Further, a load on the battery after coupling the first number of battery blocks to the voltage terminals may be estimated, and the selection of the second number of battery blocks may be performed depending on the estimated load. For this purpose, the estimated load may be compared to a threshold value, and in response to the estimated load being above the threshold value, the second number of battery blocks may be selected to be lower than the first number of the battery blocks.

Further, a charging status of at least one of the battery blocks may be detected, and the selection of the first number of battery blocks and/or of the second number of battery blocks may be performed depending on the detected charging status. Still further, a block voltage of at least one of the battery blocks may be detected, and the selection of the first number of battery blocks and/or of the second number of battery blocks may be performed depending on the detected block voltage. Still further, a fault status of at least one of the battery blocks may be monitored, and the selection of the first number of battery blocks and/or of the second number of battery blocks may be performed depending on the monitored fault status.

The battery blocks may be connected in series via a first connection node and a second connection node of at least one of the battery blocks. Due to the series connection, a voltage between the voltage terminals of the battery corresponds to the sum of the block voltages each individual battery block, as measured between the first and second connection nodes of the battery block. Depending on whether the afore-mentioned at least one battery block is selected, i.e., belongs to the first number of battery blocks or second number of battery blocks, the coupling to the voltage terminals may then be performed by switching between configurations of the battery block. These configurations of the battery block may comprise a first configuration in which a bypass connection between the first connection node and the second connection node of the battery block is open and the at least one battery cell of the battery block is connected between the first connection node and the second connection node, and a second configuration in which a bypass connection between the first connection node and the second connection node of the battery block is closed and the at least one battery cell of the battery block is disconnected from at least one of the first connection node and the second connection node of the battery block. In other words, in the first configuration the at least one battery cell may be connected between the first connection node and the second connection node of the battery block, whereas in the second configuration the first connection node and the second connection node may be directly connected, without connecting the at least one battery cell between the first connection node and the second connection node. Further, a resistor may be temporarily connected in series with the battery blocks, and the switching of the battery block between the first configuration and the second configuration may be performed while the resistor is connected in series. In this case, the resistor may provide damping of transient voltages while performing the switching while the battery is under load.

For switching between the configurations, the at least one battery block may be provided with a switching circuit. By means of the switching circuit, the at least one battery cell of the battery block can be selectively connected between the first connection node and the second connection node. The switching circuit may, for example, be include a first switch, which is connected between the first connection node and the at least one battery cell, and a second switch, which is connected between the first connection node and the second connection node. The first configuration may then correspond to the first switch being closed and the second switch being open to connect the at least one battery cell between the first connection node and the second connection node. The second configuration may then correspond to the first switch being open and the second switch being closed to connect the first connection node and the second connection node without connecting the at least one battery cell between the first connection node and the second connection node.

Accordingly, selectively connecting the at least one battery cell between the first connection node and the second connection node may be used to select between the first configuration in which the voltage between the first connection node and the second connection node of the battery block corresponds to the voltage provided by the at least one battery cell of the battery block, and the second configuration in which the voltage between the first connection node and the second connection node of the battery block is substantially zero due to the direct connection between the first connection node and the second connection node. Further, because in the second configuration the at least one battery cell is not connected between the first connection node and the second connection node of the battery block, short-circuiting or discharging of the at least one battery cell can be avoided.

By switching between the different configurations of the battery block, the output voltage of the battery, as measured across the series connection of the battery blocks may be adjusted in an efficient manner. In particular, by switching the battery block from the first configuration into the second configuration the output voltage of the battery may be reduced, and by switching the battery block from the second configuration into the first configuration the output voltage of the battery may be increased. This may, for example, be used to lower the output voltage if the battery is fully charged or to increase the output voltage if the battery is discharged to a certain degree, thereby reducing the overall variations of the output voltage. In some implementations, switching between the different configurations of the battery block may also be used to bypass the battery block if the battery block is found to be defective. Operation of the battery may then continue without this battery block.

In some implementations, the battery block may also include a capacitor connected in parallel to the at least one battery cell. The capacitor may provide damping of voltage transients when performing the switching between the configurations while the battery is under load.

In some implementations, the battery block may also include a fuse connected in series to the at least one battery cell. The fuse may help to ensure safety requirements, e.g., as imposed in the automotive sector.

In some implementations, a plurality of the battery blocks or even all of the battery blocks may be provided with the switching circuit. In this case, each of these multiple battery blocks may be controlled in the above-described manner by switching between the different configurations. In this case, also the additional capacitor and/or fuse may be provided in these battery blocks. By providing multiple or even all battery blocks with the switching circuit, a finer granularity of setting the output voltage of the battery may be provided. Further, it also becomes possible to select between the different battery blocks to be used for contributing to the output voltage of the battery, thereby balancing the usage of the different battery blocks.

In some implementations, a battery control circuit may be provided for implementing the above functionalities. For example, the battery control circuit may include a controller for implementing the selection of battery blocks. Further, the battery control circuit may also include the switching circuit. The battery control circuit may for example be implemented within a battery management system. Accordingly, the switching control may be implemented efficiently together with other battery management functionalities, e.g., charging control and/or cell balancing.

In the following, structures, functionalities and operations of devices, systems, and methods which are based on the concepts as outlined above will be further explained by referring to exemplary implementations.

Figure 1B:
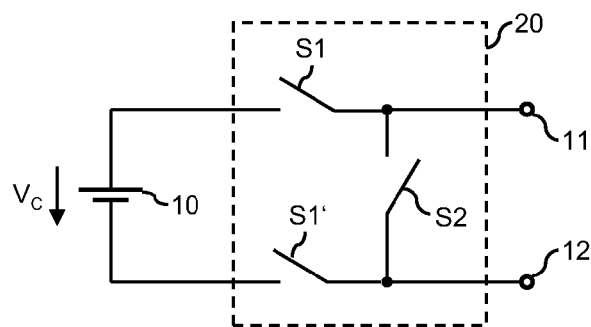
Figure 1C:
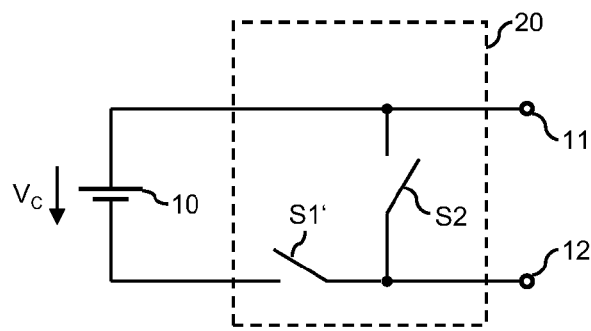

FIGS. 1A, 1B and 1C schematically illustrate exemplary structures of battery blocks, which may be used to implement the above concepts of battery control. In each case, the battery block is provided with a battery cell 10, which can be selectively coupled between a first connection node 11 and a second connection node 12 of the battery block, using a switching circuit 20. The battery cell 10 provides a cell voltage $V_C$. It should be understood, that a single battery cell 10 may be provided as illustrated in FIGS. 1A, 1B, and 1C or that also multiple battery cells may be provided in the battery block, e.g., multiple battery cells connected in series and/or in parallel, to thereby make a desired block voltage and output power available at the connection nodes 11, 12 of the battery block.

In the example of FIG. 1A, the switching circuit includes a first switch S1 and a second switch S2. The first switch S1 is connected between the first connection node 11 and the battery cell 10. The second switch S2 is connected between the first connection node 11 and the second connection node 12. If the first switch S1 is closed, the battery cell of the battery block is connected between the first connection node 11 and the second connection node 12. If the first switch S1 is open, the battery cell 11 of the battery block is not connected between the first connection node 11 and the second connection node 12 of the battery block. If the second switch S2 is closed, the first connection node 11 and the second connection node 12 of the battery block are directly connected, thereby forming a bypass connection between the first connection node 11 and the second connection node 12. If the second switch S2 is open, this bypass connection is interrupted.

As can be seen, the switching circuit 20 may be used to switch the battery block between a first configuration and a second configuration. In the first configuration the first switch S1 is closed and the second switch S2 is open, thereby connecting the battery cell 10 between the first connection node 11 and the second connection node 12 and interrupting the bypass connection. In the second configuration the first switch S1 is open and the second switch S2 is closed, thereby connecting the first connection node 11 and the second connection node 12 through the bypass connection, without connecting the battery cell 10 between the first connection node 11 and the second connection node 12. In the first configuration, the battery cell 10 is coupled between the first connection node 11 and the second connection node 12, so that the cell voltage $V_C$ of the battery cell 10 is made available at the first and second connection nodes 11, 12, e.g., for powering an electrical device, or for charging the battery cell 10. In the second configuration, the battery cell 10 is not connected to the first and second connection nodes 11, 12, so that discharging of the battery cell 10 through the closed bypass connection is avoided. Further, the charge of the disconnected battery cell 10 may be saved or the disconnected battery cell 10 may be otherwise protected, e.g., in the case of a fault being detected in the battery block.

In the example of FIG. 1B, the battery block has a structure which is generally similar to that of FIG. 1A. However, the switching circuit 20 provides an additional first switch S1' which is connected between the second connection node 12 and the battery cell 10. The additional first switch S1' may be opened in the second configuration to thereby disconnect the battery cell 10 from both the first connection node 11 and from the second connection node 12. This may allow for a better protection of the battery cell 10.

In the example of FIG. 1C, the battery block has a structure which is generally similar to that of FIG. 1A. However, rather than providing the first switch S1 connected between the battery cell 10 and the first connection node 11, the switching circuit 20 of FIG. 1C provides the first switch S1' connected between the battery cell 10 and the second connection node 12. In the first configuration the first switch S1' is closed and the second switch S2 is open, thereby connecting the battery cell 10 between the first connection node 11 and the second connection node 12 and interrupting the bypass connection. In the second configuration the first switch S1' is open and the second switch S2 is closed, thereby connecting the first connection node 11 and the second connection node 12 through the bypass connection, without connecting the battery cell 10 between the first connection node 11 and the second connection node 12.

Figure 2:
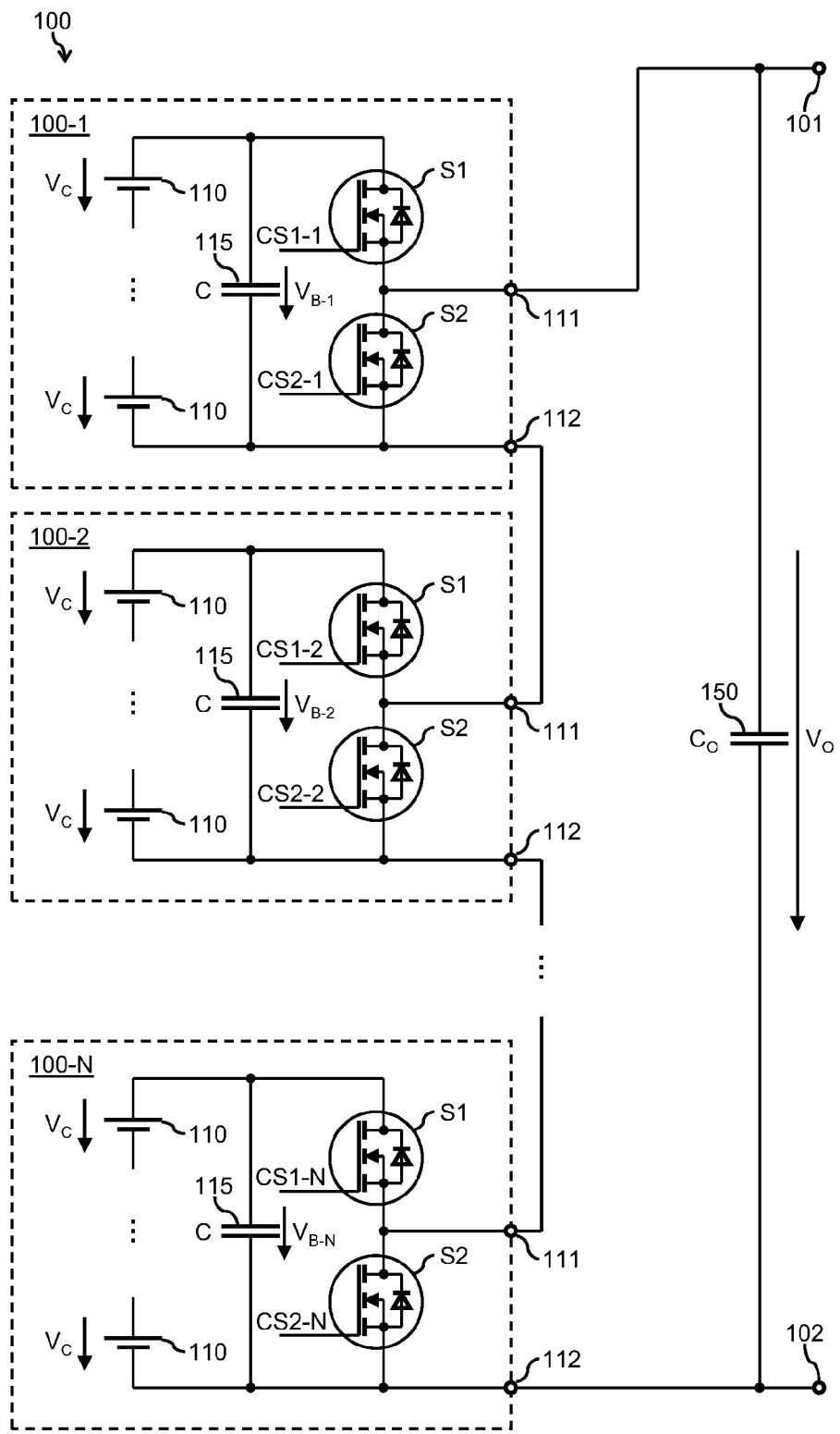
FIG. 2 schematically illustrates a device according to an embodiment of the invention.

FIG. 2 schematically illustrates a battery 100. The battery 100 may, for example, be used for implementing a vehicle battery which supplies power to an electric motor of an electric or hybrid vehicle. For the latter purpose, an output voltage $V_O$ of the battery 100 may be fed through a known type of inverter. However, due to the switchable configuration of battery blocks, the variations of the output voltage $V_O$ may be limited in an efficient manner, so that the inverter can be implemented in a cost efficient manner.

As illustrated, the battery 100 is organized in a plurality of battery blocks 100-1, 100-2, ..., 100-N. Each of the battery blocks in turn includes one or more battery cells 110. The battery cells 110 may, for example, be implemented as Lithium-ion battery cells. The number of the battery cells 110 in each battery block 100-1, 100-2, ..., 100-N may be ten, and the total number of the battery blocks 100-1, 100-2, ..., 100-N may be 16.

In the illustrated implementation, the battery cells 110 in each battery block 100-1, 100-2, ..., 100-N are connected in series, so that cell voltages $V_C$ provided by the individual battery cells 110 sum up to a total block voltage $V_B$. The battery blocks 100-1, 100-2, ..., 100-N are connected in series between a first output voltage terminal 101 and a second output voltage terminal 102 of the battery 100. This series connection is accomplished via a first connection node 111 and a second connection node 112 of each battery block 100-1, 100-2, ..., 100-N. In particular, the first connection node 111 of the first battery block 100-1 of the series connection is connected to the first output voltage terminal 101, and the second connection node 112 of the first battery block 100-1 is connected to the first connection node 111 of the next battery block 100-2 of the series connection. This is continued until the last battery block 100-N of the series connection. The second connection node 112 of the last battery block 100-N of the series connection is connected to the second output voltage terminal 102 of the battery 100.

In addition, an intermediate circuit is formed by a capacitor 150, which is connected in parallel to the series connection of the battery blocks 100-1, 100-2, ..., 100-N, between the first output voltage terminal 101 and the second output voltage terminal 102. In a known manner, the intermediate circuit may be used as a temporary energy storage.

Each of the battery blocks 100-1, 100-2, ..., 100-N is further provided with a switching circuit. The switching circuit may be used to selectively connect the battery cells 110 of the battery block 100-1, 100-2, ..., 100-N between the first connection node 111 and the second connection node 112 of the battery block 100-1, 100-2, ..., 100-N.

In the illustrated example, the switching circuit includes a first switch S1 and a second switch S2. The first switch S1 is connected between the first connection node 111 and the battery cells 110. The second switch S2 is connected between the first connection node 111 and the second connection node 112. If the first switch S1 is closed, the battery cells 110 of the battery block 100-1, 100-2, ..., 100-N are connected between the first connection node 111 and the second connection node 112. If the first switch S1 is open, the battery cells 110 of the battery block 100-1, 100-2, ..., 100-N are not connected between the first connection node 111 and the second connection node 112 of the battery block 100-1, 100-2, ..., 100-N. If the second switch S2 is closed, the first connection node 111 and the second connection node 112 of the battery block 100-1, 100-2, ..., 100-N are directly connected, thereby bypassing the battery block 100-1, 100-2, ..., 100-N in the series connection of battery blocks 100-1, 100-2, ..., 100-N. If the second switch S2 is open, this bypass connection is interrupted. As can be seen, the structure of the switching circuit is generally similar to the switching circuit 20 in the example of FIG. 1A. However, it should be understood that also a structure of the switching circuit as illustrated in FIG. 1B or 1C could be utilized. Also, the structures of the switching circuits could differ between the individual battery blocks 100-1, 100-2, ..., 100-N.

As mentioned above, the switching circuit may be used to switch the battery block 100-1, 100-2, ..., 100-N between a first configuration and a second configuration. In the first configuration the first switch S1 is closed and the second switch S2 is open, thereby connecting the battery cells 110 between the first connection node 111 and the second connection node 112 and interrupting the bypass connection. In the second configuration the first switch S1 is open and the second switch S2 is closed, thereby connecting the first connection node 111 and the second connection node 112 through the bypass connection, without connecting the battery cells 110 between the first connection node 111 and the second connection node 112. The first switches S1 and the second switches S2 of the battery blocks are controlled by control signals CS 1-1, CS2-2, CS 1-2, CS2-2, ..., CS 1-N, CS2-N. Accordingly, each of the battery blocks 100-1, 100-2, ..., 100-N can be individually switched between the first configuration and the second configuration. The control signals CS 1-1, CS2-2, CS 1-2, CS2-2, ..., CS 1-N, CS2-N may be provided by a battery management system.

As further illustrated, the switching circuits of the battery blocks 100-1, 100-2, ..., 100-N may be implemented on the basis of Metal Oxide Semiconductor Field Effect Transistors (MOSFETs). In particular, a first MOSFET may be used for implementing the first switch S1, and a second MOSFET may be used for implementing the second switch S2. Since the switching circuits are implemented on the level of the battery blocks 100-1, 100-2, ..., 100-N, the breakthrough-voltage requirements of the MOSFETs are determined by the maximum block voltage $V_B$ of the battery block 100-1, 100-2, ..., 100-N, which is significantly lower than the maximum output voltage $V_O$ of the battery 100. Accordingly, the switching circuits can be implemented in a cost efficient manner using low-voltage MOSFET technology. Using low-voltage MOSFET technology may also allow for achieving low current dissipation losses by using MOSFETs having a low forward resistance. In some implementations, the switches S1 and S2 may also be implemented by a parallel connection of two or more MOSFETs, thereby further reducing the effective forward resistance of the switches S1 and S2. The effective forward resistances of the switches S1 and S2 may, for example, be in the range of 2 mΩ or lower, preferably lower than 1 mΩ.

By individually switching the battery blocks 100-1, 100-2, ..., 100-N between the first configuration and the second configuration, the output voltage $V_O$ of the battery 100 can be set in an efficient manner. In particular, if a battery block 100-1, 100-2, ..., 100-N is in the first configuration, its block voltage $V_B$ contributes to the output voltage V0 of the battery 100, while in the second configuration the battery block 100-1, 100-2, ..., 100-N is bypassed and its block voltage $V_B$ does not contribute to the output voltage $V_O$ of the battery 100. Accordingly, by switching one or more of the battery blocks 100-1, 100-2, ..., 100-N from the first configuration into the second configuration, the output voltage $V_O$ of the battery 100 may be reduced, while switching one or more of the battery blocks 100-1, 100-2, ..., 100-N from the second configuration into the first configuration may be used to increase the output voltage $V_O$ of the battery 100.

For example, in the above-mentioned example of using 16 battery blocks 100-1, 100-2, ..., 100-N which are each provided with ten Lithium ion battery cells 110 with maximum cell voltage $V_C$ of 4.0 V at full charge, each fully charged battery block 100-1, 100-2, ..., 100-N may contribute 40 V to the output voltage $V_O$ of the battery 100. If the battery 100 is fully charged, it is therefore possible to generate a nominal output voltage $V_O$ of 400 V by switching ten of the battery blocks 100-1, 100-2, ..., 100-N into the first configuration, and switching the other battery blocks 100-1, 100-2, ..., 100-N into the second configuration. As the battery 100 discharges and the cell voltages $V_C$ decrease, more battery blocks 100-1, 100-2, ..., 100-N may be switched into the first configuration so that there is no corresponding decrease of the output voltage $V_O$. If the battery 100 is almost discharged and the cell voltages have dropped to about 2.5 V, all battery blocks 100-1, 100-2, ..., 100-N may be switched into the first configuration to still yield the nominal output voltage $V_O$ of 400 V.

In some implementations, switching between the first configuration and the second configuration of the battery blocks 100-1, 100-2, ..., 100-N may be performed while there is no load on the battery 100. For example, if the battery 100 is used for supplying electric power to an electric motor of an electric or hybrid vehicle, the power of the electric motor may be temporarily reduced to zero, and the switching may be performed while the power of the electric motor is zero. Since the switching can be performed on a short timescale of a few milliseconds, such control can be implemented to be unnoticeable to the operator of the vehicle. Performing the switching while there is no load on the battery 100 avoids problems due to transient voltages.

In some implementations, switching between the first configuration and the second configuration of the battery blocks 100-1, 100-2, ..., 100-N may be performed while there is load on the battery 100. In this case, transient voltages may be reduced by providing the battery blocks 100-1, 100-2, ..., 100-N with a capacitor 115 for damping such transient voltages. As illustrated in FIG. 1, the capacitor 115 may be connected in parallel to the battery cells 110 of the battery block 100-1, 100-2, ..., 100-N.

In some implementations, also an additional damping circuit may be provided to achieve damping of transient voltages when switching between the first configuration and the second configuration of the battery blocks 100-1, 100-2, ..., 100-N while there is load on the battery 100. A corresponding implementation is schematically illustrated in FIG. 3.

Figure 3:
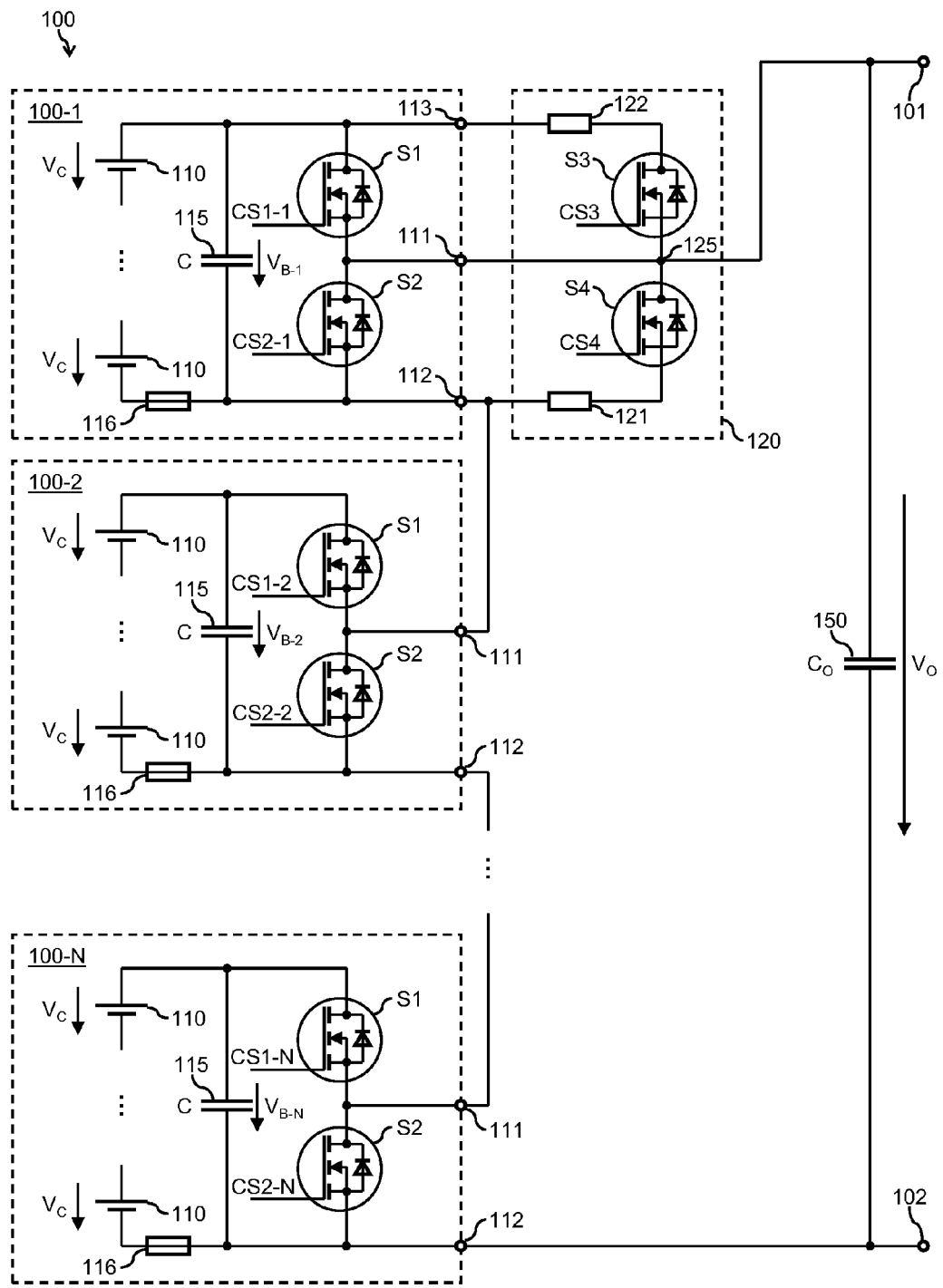
FIG. 3 schematically illustrates a further device according to an embodiment of the invention.

The implementation of FIG. 3 generally corresponds to the implementation of FIG. 3, and similar elements have been designated by the same reference signs. For details concerning such elements, reference is made to the corresponding description in connection with FIG. 2.

In the implementation of FIG. 3, an additional damping circuit 120 is provided. The damping circuit 120 is configured to allow for selectively connecting a resistor 121, 122 in series with the battery blocks 100-1, 100-2, ..., 100-N. In the illustrated example, this is achieved by connecting the damping circuit 120 between the first battery block 100-1 of the series connection and the first output voltage terminal 101 of the battery 100.

The damping circuit 120 is of the illustrated implementation is provided with a first resistor 121, a second resistor 122, a first switch S3 and a second switch S4. The first resistor 121 and the second resistor 122 may have substantially the same resistance value, e.g., of about 0.2Ω. As in the switching circuits of the battery blocks 100-1, 100-2, ..., 100-N, the first switch S3 and the second switch S4 of the damping circuit 120 may be implemented using MOSFET technology. The breakthrough-voltage requirements of the first switch S3 and the second switch S4 of the damping circuit are determined by the maximum block voltage $V_B$ of the battery block 100-1 to which the damping circuit is connected. Accordingly, a cost and loss efficient implementation using low-voltage MOSFET technology is possible.

In the damping circuit 120, a node 125 between the first switch S3 and the second switch S4 of the damping circuit 120 is connected to the first output voltage terminal 101 of the battery 100. The node 125 is also connected to the first connection node 111 of the battery block 100-1. The first resistor 121 is via the second switch S4 of the damping circuit 120 between the node 125 and the second connection node 112 of the battery block 100-1. The second resistor 122 is connected via the first switch S3 of the damping circuit 120 between the node 125 and a third connection node 113 of the battery block 100-1. The third connection node 113 of the battery block 100-1 is located between the first switch S1 of the battery block 100-1 and the battery cells 110 of the battery block 100-1. The first switch S3 and the second switch S4 of the damping circuit 120 are controlled by control signals CS3 and CS4, respectively. Similar to the control signals CS1-1, CS2-2, CS1-2, CS2-2, ..., CS1-N, CS2-N, the control signals CS3 and CS4 may be provided by the battery management system.

Depending on whether or not the battery block 100-1 is bypassed in the series connection of the battery blocks 100-1, 100-2, ..., 100-N, either the first resistor 121 or the second resistor 122 may be selectively added to this series connection. In particular, if the battery block 100-1 is bypassed, the damping circuit 120 may be operated to selectively connect the first resistor 121 to the second connection node 112 of the battery block 100-1 by opening the second switch S4 of the damping circuit 120 and closing the first switch S3 of the damping circuit 120. In this case, both switches S1 and S2 of the battery block 100-1 are opened so that the first resistor 121 is connected via the second connection node 112 of the battery block 100-1 to the first connection node 111 of the next battery block 100-2 of the series connection. If the battery block 100-1 is not bypassed, the damping circuit 120 may be operated to selectively connect the second resistor 122 to the third connection node 113 of the battery block 100-1 by opening the first switch S3 of the damping circuit 120 and closing the second switch S4 of the damping circuit 120. Also in this case, both switches S1 and S2 of the battery block 100-1 are opened so that the second resistor 122 is connected via the third connection node 113 to the battery cells 110 of the battery block 100-1. If none of the resistors 121 and 122 is to be connected to the series connection of the battery blocks 100-1, 100-2, ..., 100-N, the first switch S3 and the second switch S4 of the damping circuit 120 are opened so that the first output voltage terminal 101 of the battery 100 is connected to the first connection node 111 of the battery block 100-1 as in the implementation of FIG. 2.

When switching the configuration of one or more of the battery cells 100-1, 100-2, ..., 100-N while the battery 100 is under load, the resistor 121 or 122 may be temporarily connected in series to the battery cells 100-1, 100-2, ..., 100-N, thereby damping transient voltages. The switches S3 and S4 of the damping circuit 120 may also be used for efficient pre-charging of the capacitor 150 in the intermediate circuit.

In addition, the implementation of FIG. 3 also provides a fuse 116 in each of the battery blocks 100-1, 100-2, ..., 100-N. The fuse 116 may help to meet certain safety requirements as for example imposed for automotive applications. The fuse 116 may, for example, prevent short circuiting or deep discharging of the battery cells 110 and thereby reduce the risk of overheating or even explosion of the battery 100.

Figure 4:
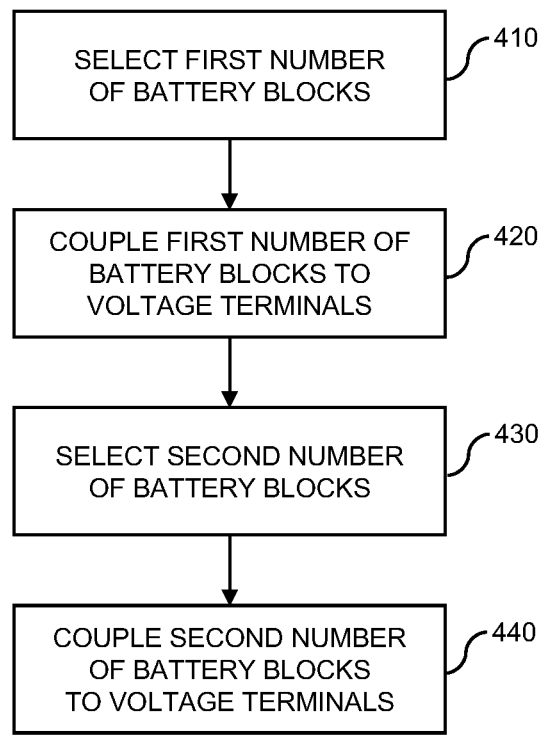
FIG. 4 shows a flowchart for illustrating a battery control method according to an embodiment of the invention.

FIG. 4 shows a flowchart for illustrating a method of controlling a battery, e.g., the above-mentioned battery 100. The steps of the method may for example be performed by a by a suitably configured controller of a battery control circuit, e.g., as implemented in a battery management system. In the method, it is assumed that the battery is provided with a plurality of battery blocks, of which at least a part can be selectively coupled to voltage terminals of the battery, e.g., using switching circuits as explained above. Each battery block typically includes one or more battery cells to provide a block voltage of the battery block.

At step 410, a first number of the battery blocks is selected. For example, if the battery is fully charged or close to fully charged, this first number of battery blocks may include less than all battery blocks in the battery. Similarly, if the battery is close to being discharged, the first number of battery blocks could include all battery blocks of the battery.

At step 420, the first number of the battery blocks is coupled to the voltage terminals of the battery to set a battery voltage which corresponds to the sum of the block voltages of the first number of battery blocks. For this purpose, the selected first number of battery blocks may be switched into the above-mentioned first configuration, whereas other battery blocks may be switched into the above-mentioned second configuration. In this way, a series connection of the selected battery blocks may be formed between the voltage terminals of the battery, whereas other battery blocks are bypassed, and therefore do not contribute to the battery voltage.

At step 430, a second number of the battery blocks is selected. For example, if the battery has further discharged after step 420, the second number of battery blocks may be less than the first number of battery blocks. Similarly, if the battery was further charged after step 420, the second number of battery blocks could larger than the first number of battery blocks. The first and second numbers may differ in magnitude. However, the first and second numbers may also have the same magnitude, but include at least one different battery block.

At step 440, the second number of the battery blocks is coupled to the voltage terminals of the battery to set a battery voltage which corresponds to the sum of the block voltages of the second number of battery blocks. For this purpose, the selected second number of battery blocks may be switched into the above-mentioned first configuration, whereas other battery blocks may be switched into the above-mentioned second configuration. In this way, a series connection of the selected battery blocks may be formed between the voltage terminals of the battery, whereas other batter blocks are bypassed, and therefore do not contribute to the battery voltage.

Figure 5:
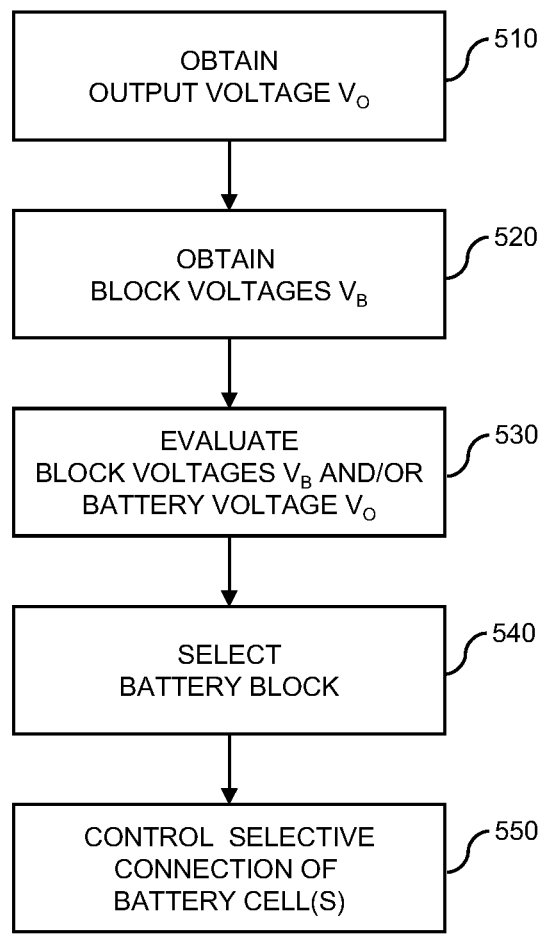
FIG. 5 shows a flowchart for illustrating a further battery control method according to an embodiment of the invention.

FIG. 5 shows a flowchart for illustrating a further method of controlling a battery, e.g., the above-mentioned battery 100. The steps of the method may, for example, be performed by a suitably configured controller of a battery control circuit, e.g., as implemented in a battery management system.

As illustrated by step 510, the method assumes that an output voltage is obtained from a plurality of battery blocks of the battery, which are connected in series via a first connection node and a second connection node of each battery block, such as explained for the output voltage $V_O$ of the battery 100. The output voltage may, for example, be provided as an input parameter to the battery management system.

In addition, as illustrated by step 520, the method may also optionally include obtaining block voltages provided by the individual battery blocks, such as the block voltages $V_B$ explained in connection with FIGS. 2 and 3.

As illustrated by step 530, the battery voltage and/or the block voltages may then be evaluated, e.g., by comparison to threshold values.

As illustrated by step 540, a battery block may be selected. This may, for example, be accomplished on the basis of the evaluation (s) of step 530.

At step 550, selective connection of at least one battery cell between the first connection node and the second connection node of the battery block is controlled for at least one of the battery blocks. This at least one battery block may for example be selected in step 530. The control process may also otherwise depend on the evaluation of step 530. For example, depending on the output voltage of the battery the at least one battery cell may be connected between the connection terminals of the battery block or the battery block may be bypassed. The control process may also depend on other input parameters, e.g., on a fault state of one or more battery blocks or on a load on the battery. In automotive applications, such load may, for example, be determined from a driving state of the vehicle.

Exemplary control processes involving the selective connection of the battery cells will now be further explained by referring to flowcharts as illustrated in FIGS. 6 to 9.

Figure 6:
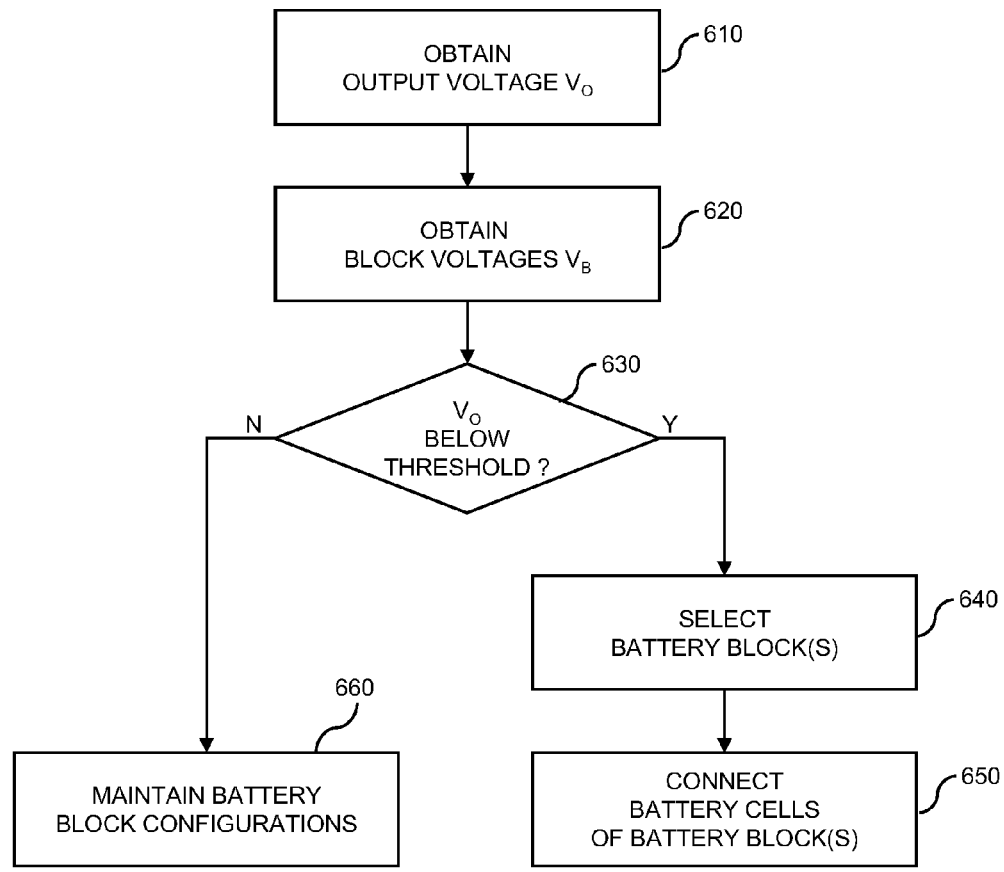
FIG. 6 shows a flowchart for illustrating a further battery control method according to an embodiment of the invention.

In the control process of FIG. 6, the configuration of a battery block is switched depending on the output voltage of the battery. The control process of FIG. 6 may, for example, be used when discharging the battery and the cell voltages decrease.

As illustrated by steps 610, the output voltage may be obtained. In addition, as illustrated by step 620, also the individual block voltages may be obtained.

At step 630, it is checked whether the output voltage is below a threshold value. If this is the case, as illustrated by branch "Y," the method proceeds with step 640.

At step 640, one or more of the battery blocks may be selected. The selection is performed from battery blocks in which the battery cells are not connected between the first connection node and the second connection node, i.e., which are bypassed. For example, the selection may be accomplished on the basis of the block voltages as obtained at step 620. The block voltages could be used to determine a charging state of each battery block, and the battery block having the highest charging state could be selected. Alternatively or in addition, the selection could also be based on a comparison of the block voltages to a difference between the output voltage and a nominal output voltage of the battery. In the latter case, a battery block having a block voltage which is close to this difference could be selected.

At step 650, the battery cells of the selected battery block(s) are connected between the first connection node and the second connection node of the battery block. In this way, the output voltage may be increased to be closer to its nominal value.

If the check of step 630 reveals that the output voltage is not below the threshold value, the method may proceed with step 660, as indicated by branch "N."

At step 660, the configurations of the battery blocks are maintained.

Figure 7:
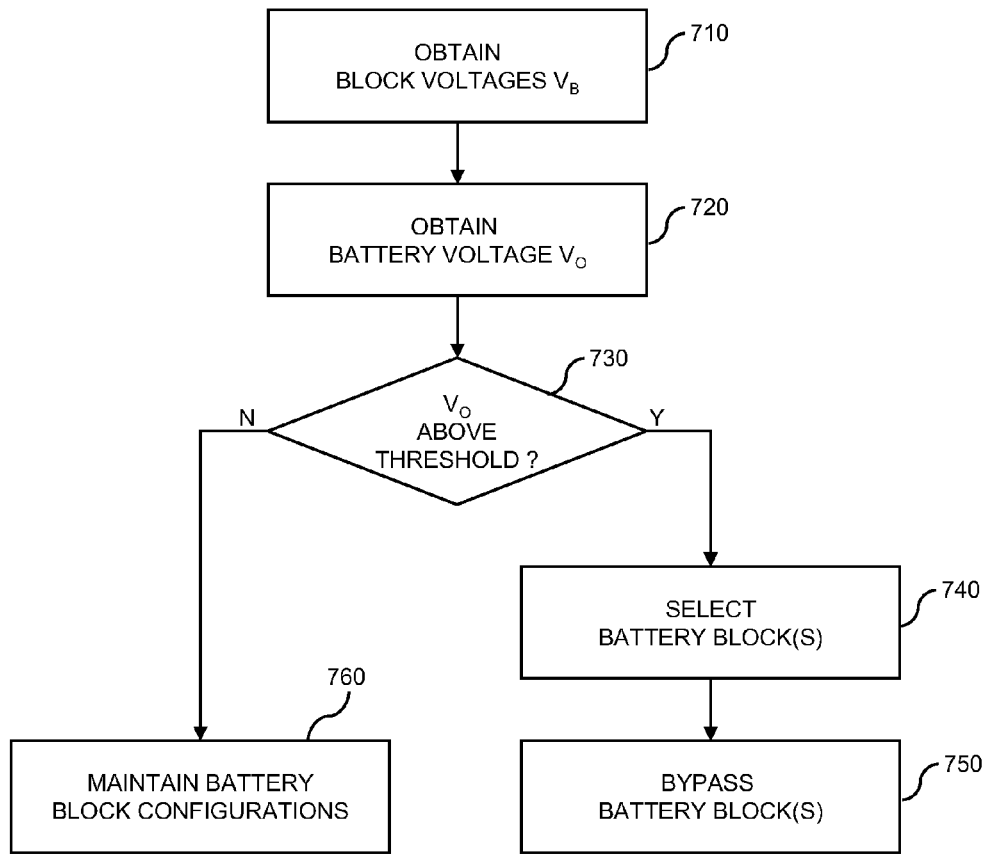
FIG. 7 shows a flowchart for illustrating a further battery control method according to an embodiment of the invention.

Also in the control process of FIG. 7, the configuration of a battery block is switched depending on the output voltage of the battery. The control process of FIG. 7 may, for example, be used when charging the battery and the cell voltages increase.

As illustrated by step 710, the output voltage may be obtained. In addition, as illustrated by step 720, also the individual block voltages may be obtained.

At step 730, it is checked whether the output voltage is above a threshold value. If this is the case, as illustrated by branch "Y," the method proceeds with step 740.

At step 740, one or more of the battery blocks may be selected. The selection is performed from battery blocks in which the battery cells are connected between the first connection node and the second connection node, i.e., which are not bypassed. For example, the selection may be accomplished on the basis of the block voltages as obtained at step 720. The block voltages could be used to determine a charging state of each battery block, and the battery block having the lowest charging state could be selected. Alternatively or in addition, the selection could also be based on a comparison of the block voltages to a difference between the output voltage and a nominal output voltage of the battery. In the latter case, a battery block having a block voltage which is close to this difference could be selected.

At step 750, the selected battery block(s) are bypassed, without connecting the battery cells between the first connection node and the second connection node of the battery block. In this way, the output voltage may be reduced to be closer to its nominal value.

If the check of step 730 reveals that the output voltage is not above the threshold value, the method may proceed with step 760, as indicated by branch "N."

At step 760, the configurations of the battery blocks are maintained.

Figure 8:
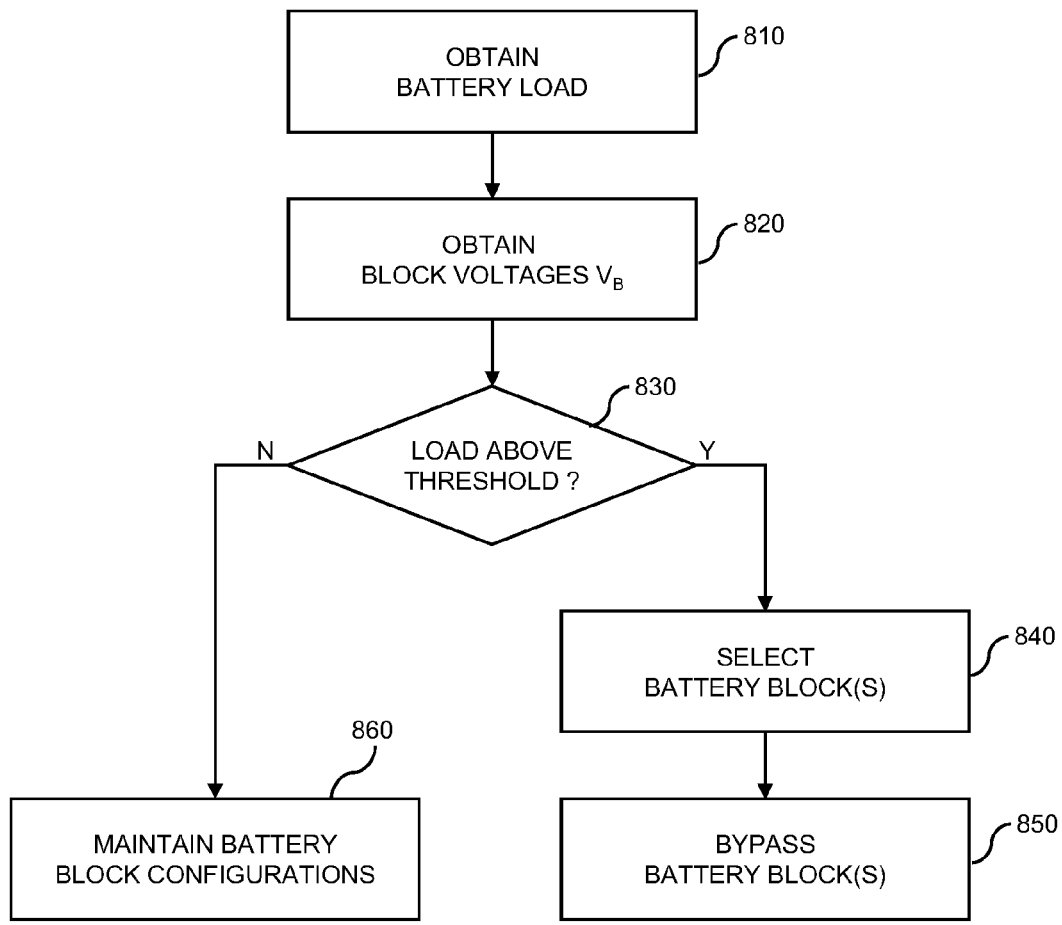
FIG. 8 shows a flowchart for illustrating a further battery control method according to an embodiment of the invention.

In the control process of FIG. 8, the configuration of a battery block is switched depending on the load on the battery.

As illustrated by steps 810, the load on the battery may be obtained. For example in an automotive application, this may be accomplished by evaluating a driving state of the vehicle, e.g., in terms of velocity, acceleration, sensor data, driver input, or the like. In addition, as illustrated by step 820, also the individual block voltages may be obtained.

At step 830, it is checked whether the load is above a threshold value. If this is the case, as illustrated by branch "Y," the method proceeds with step 840.

At step 840, one or more of the battery blocks may be selected. The selection is performed from battery blocks in which the battery cells are connected between the first connection node and the second connection node, i.e., which are not bypassed. For example, the selection may be accomplished on the basis of the block voltages as obtained at step 620. For example, the block voltages could be used to determine a charging state of each battery block, and the battery block having the lowest charging state could be selected.

At step 850, the selected battery block(s) are bypassed, without connecting the battery cells between the first connection node and the second connection node of the battery block. In this way, the output voltage may be reduced which may help to avoid undue stress on certain components arising under high load. For example in automotive applications such increased load may arise when accelerating the vehicle from zero velocity in an uphill direction (also referred to as hill hold scenario). Such scenario, in which the electric motor is required to provide high power at low number of revolutions, may specifically cause stress on semiconductor components in the inverter which receives the output voltage of the battery. Using a lower output voltage may reduce such stress and allow for operating the inverter at higher efficiency. The configuration change of step 850 may be temporal and returned to its initial state after a certain time period. Alternatively, the configuration change of step 650 may be restored in response to the load returning below the threshold value.

If the check of step 830 reveals that the load is not above the threshold value, the method may proceed with step 660, as indicated by branch "N."

At step 860, the configurations of the battery blocks are maintained.

Figure 9:
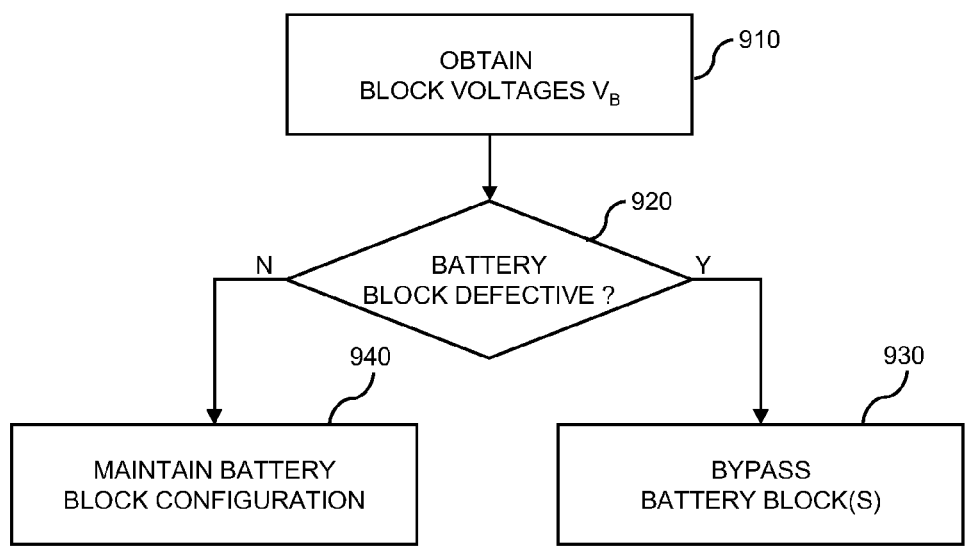
FIG. 9 shows a flowchart for illustrating a further battery control method according to an embodiment of the invention.

In the control process of FIG. 9, the configuration of a battery block is switched depending on a fault state of the battery block.

As illustrated by step 910 the block voltages of the battery may be obtained.

At step 920, it is checked whether a battery block is defective. Such fault could be detected by evaluating the block voltages obtained at step 910. For example, a certain battery block could be detected as defective if its block voltage is below a critical threshold, e.g., indicating imminent deep discharging. If a battery block is found to be defective, the method proceeds with step 930, as illustrated by branch "Y."

At step 930, the battery block which was found to be defective is bypassed, without connecting the battery cells between the first connection node and the second connection node of the battery block. In this way, the operation of the battery may continue without the defective battery block.

If the check of step 920 reveals that there is no defective battery block, the method may proceed with step 940, as indicated by branch "N."

At step 940, the configurations of the battery blocks are maintained.

Figure 10:
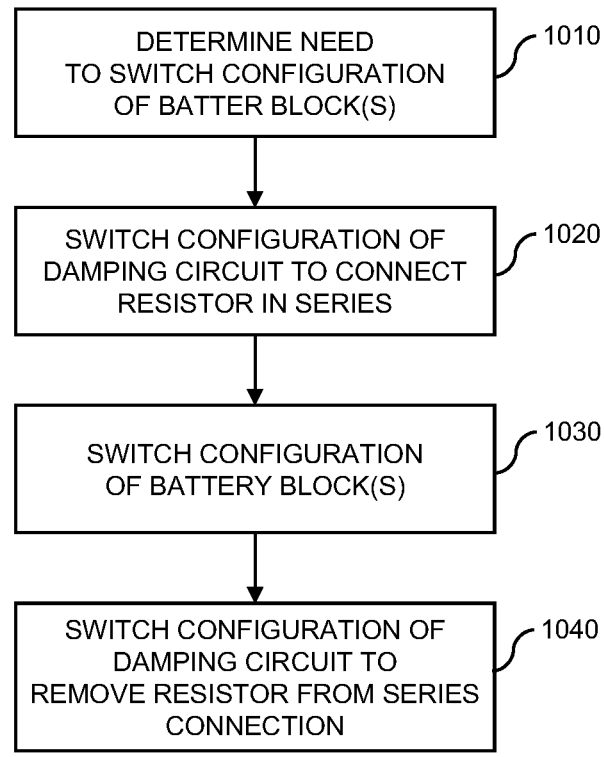
FIG. 10 shows a flowchart for illustrating a further battery control method according to an embodiment of the invention.

FIG. 10 shows a flowchart for illustrating a method in which a resistor is selectively connected in series with the battery blocks, e.g., by means of a damping circuit as illustrated in FIG. 3. The steps of the method may be performed under the control of a battery management system.

At step 1010, the need to switch the configuration of one or more battery blocks is determined, e.g., in the course of a process as illustrated in FIGS. 5 to 9.

At step 1020, the configuration of the damping circuit is switched to connect the resistor in series to the battery block(s).

At step 1030, the configuration of the battery block(s) is switched, e.g., either by connecting the battery cells or by disconnecting the battery cells and bypassing the battery block. At this point, any transient voltages due to the switching are damped by the connected resistor, even if the switching is performed while the battery is under load.

At step 1040, the configuration of the damping circuit is switched again to remove the resistor from the series connection. In this way, losses in the resistor during operation of the battery may be avoided.

It is to be understood that the different processes of the methods of FIGS. 4 to 10 may be combined with each other as appropriate, to thereby arrive at procedures in which different numbers or groups of battery blocks are selected according to various operating conditions.

Figure 11:
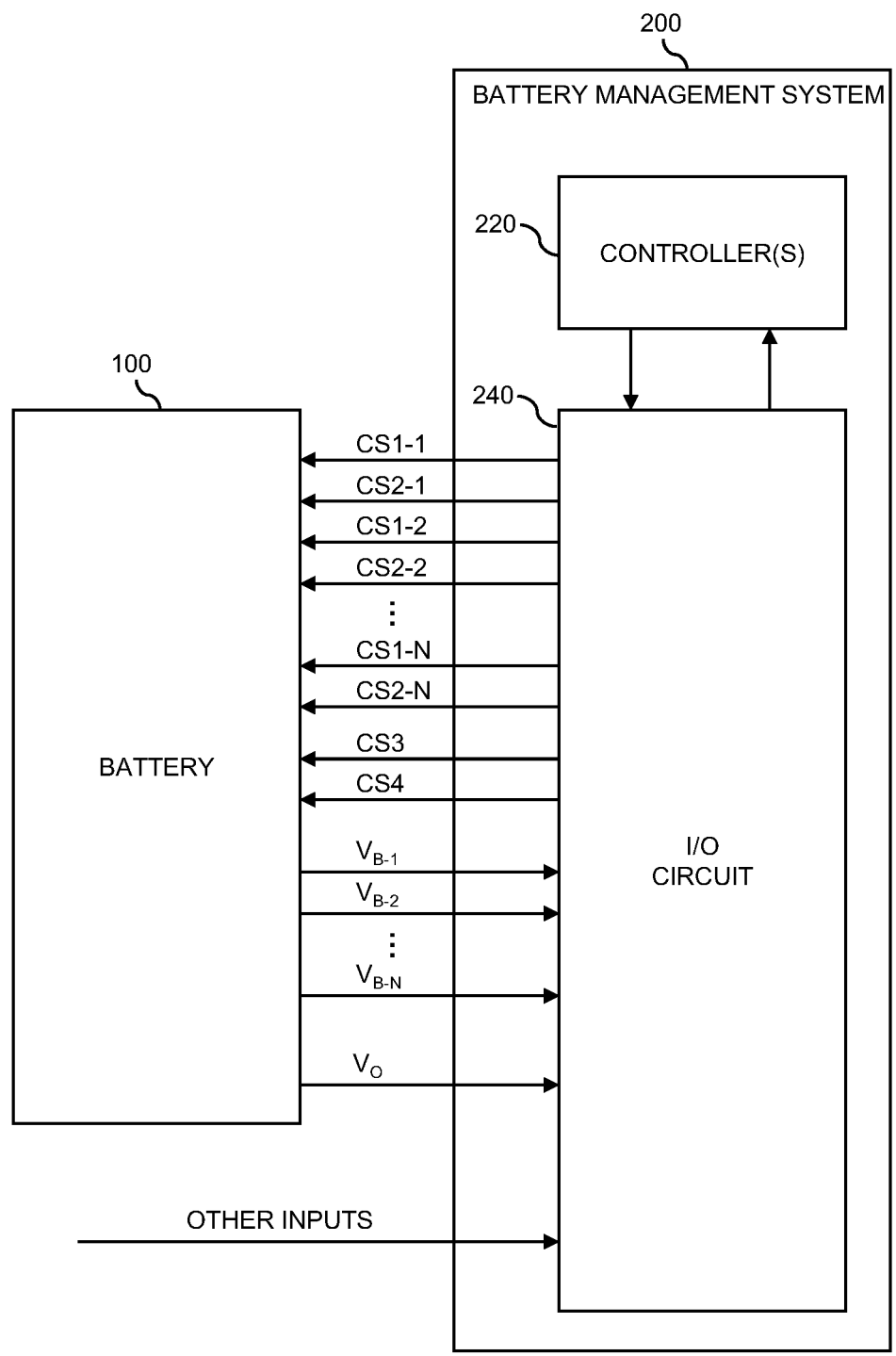
FIG. 11 schematically illustrates a system including a battery management system according to an embodiment of the invention.

FIG. 11 schematically illustrates usage of a battery management system for implementing the above concepts. More specifically, FIG. 11 schematically illustrates a battery system including a battery 100, e.g., as illustrated in FIG. 2 or 3 and a battery management system 200.

As illustrated, the battery management system 200 includes one or more controllers 220 and an input/output (I/O) circuit 240. The controller(s) may in particular implement the above-described functionalities of selecting battery blocks and controlling the switching of configurations of one or more battery blocks. The controller(s) 220 may be implemented by one or more processors which execute suitably configured program code. Alternatively, or in addition, such functionalities may also be hard-wired in the controller(s).

The I/O circuit 240 may in turn be responsible for conditioning the control signals CS1-1, CS2-2, CS 1-2, CS2-2, . . . , CS 1-N, CS2-N, CS3, and/or CS4 provided to the battery 100. For example, the I/O circuit 240 may provide potential separation of the low voltage control domain of the battery management system 200 from the high-voltage domain of the battery 100, e.g., by galvanic separation or daisy chaining. Further, the I/O circuit 240 may also provide drivers for generating the control signals CS1-1, CS2-2, CS1-2, CS2-2, . . . , CS 1-N, CS2-N, CS3, and/or CS4. Still further, the I/O circuit 240 may provide elements for the required processing of input signals, e.g., analog/digital conversion of measured voltages, such as the block voltages $V_{B-1}$, $V_{B-2}$, . . . , $V_{B-N}$ or the output voltage $V_O$, or other inputs, such as parameters reflecting the driving state of a vehicle.

As a matter of course, the battery management system may also be configured to accomplish other functionalities, e.g., known functionalities of a battery management system such as charging control, cell balancing, or the like.

As can be seen, the concepts as described herein may be used for controlling a battery in a highly efficient manner. Specifically, the battery itself may be provided with a scalable structure which allows for efficiently selecting certain battery blocks to contribute to the output voltage of the battery. In this way, variations of the output voltage may be limited. Further, a defective battery block may be bypassed and operation of the battery continued with the other battery blocks. Still further, suitable selection of the battery blocks which contribute to the output voltage of the battery may allow for efficient usage of the energy stored in each battery block. For example, a battery block may be used up to its discharge limit and then be replaced by another battery block. In this way, a better utilization of the overall capacity of the battery becomes possible. In automotive applications this may, for example, allow for increasing the operation range of a vehicle.

It is to be understood that the above-described concepts are susceptible to various modifications. For example, the number of battery blocks may be suitably selected. Similarly, also the number of battery cells in each battery block may be suitably selected. For example, it is also possible to use different battery cell numbers in the different battery blocks. Moreover, it is to be understood that the selective connection of battery cells may not only be utilized while using the battery for power supply purposes, but also during charging of the battery. In this case, only certain battery blocks may be selected for charging. Such charging of the battery may also be accomplished using recuperated energy. Still further, it is to be understood that the battery blocks with switchable configurations as described herein may also be combined with other types of battery blocks, e.g., based on a different battery technology. The battery may also implement multiple kinds of battery technology. For example, some battery blocks may be implemented on the basis of high-performance battery cells while other battery blocks may be implemented on the basis of high-energy cells. The above concepts may then also be used to select between such battery blocks, depending on the operating conditions. Further, the concepts may not only be applied in connection with electrochemical battery cells, but for example, also in connection with other technologies for storage of electrical energy, e.g., supercapacitors. Accordingly, the term "battery" as used above is not to be understood as merely referring to electrochemical battery technology, but also to other technologies for storage of electrical energy. Still further, the above-described control functionalities may not only be implemented by a central battery management system, but may also at least on part be implemented distributed between various decentralized controllers, e.g., implemented locally at each battery block.

What is claimed is:

1. A method of controlling a battery comprising a plurality of battery blocks, each of the battery blocks comprising at least one battery cell to provide a block voltage of the battery block, the method comprising:
    selecting a first number of the battery blocks;
    coupling the first number of the battery blocks to voltage terminals of the battery to set a battery voltage that corresponds to the sum of the block voltages of the first number of the battery blocks;
    selecting a second number of the battery blocks, wherein selecting the second number of the battery blocks comprises:
    estimating a load on the battery;
    comparing the estimated load to a threshold value; and
    selecting the second number of the battery blocks to be lower than the first number of the battery blocks when the estimated load is above the threshold value; and
    coupling the second number of the battery blocks to the voltage terminals of the battery to set a battery voltage that corresponds to the sum of the block voltages of the second number of the battery blocks.

2. The method according to claim 1, further comprising applying the battery voltage produced by the selected battery blocks to an electrical device connected to the voltage terminals of the battery.

3. The method according to claim 1, further comprising charging the selected battery blocks by applying a charging voltage to the voltage terminals of the battery.

4. The method according to claim 1, further comprising:
    detecting the battery voltage after coupling the first number of the battery blocks to the voltage terminals; and
    performing the selection of the second number of the battery blocks depending on the detected battery voltage.

5. The method according to claim 4, further comprising:
    comparing the detected battery voltage to a threshold value; and
    in response to the determined battery voltage being below the threshold value, selecting the second number of the battery blocks to be higher than the first number of the battery blocks.

6. The method according to claim 1, further comprising:
    detecting a charging status of at least one of the battery blocks; and
    performing the selection of the first number of the battery blocks and/or of the second number of the battery blocks depending on the detected charging status.

7. The method according to claim 1, further comprising:
    detecting a block voltage of at least one of the battery blocks; and performing the selection of the first number of the battery blocks and/or of the second number of the battery blocks depending on the detected block voltage.

8. The method according to claim 1, further comprising:
monitoring a fault status of at least one of the battery blocks; and
performing the selection of the first number of the battery blocks and/or of the second number of the battery blocks depending on the monitored fault status.

9. The method according to claim 1, further comprising:
connecting the battery blocks in series via a first connection node and a second connection node of at least one of the battery blocks; and
depending on the at least one battery block being selected, performing the coupling to the voltage terminals by switching between configurations of the battery block,
the configurations of the battery block comprising:
a first configuration in which a bypass connection between the first connection node and the second connection node of the battery block is open and the at least one battery cell of the battery block is connected between the first connection node and the second connection node, and
a second configuration in which a bypass connection between the first connection node and the second connection node of the battery block is closed and the at least one battery cell of the battery block is disconnected from at least one of the first connection node and the second connection node of the battery block.

10. The method according to claim 9, further comprising:
temporarily connecting a resistor in series with the battery blocks; and
while the resistor is connected in series, switching the battery block between the first configuration and the second configuration.

11. A battery control circuit for a battery comprising:
a plurality of battery blocks, each of the battery blocks comprising at least one battery cell to provide a block voltage of the battery block;
a controller configured to:
select a first number of the battery blocks;
control coupling the first number of the battery blocks to voltage terminals of the battery to set a battery voltage which corresponds to the sum of the block voltages of the first number of the battery blocks;
select a second number of the battery blocks, wherein to select the second number of the battery blocks comprises to:
estimate a load on the battery;
compare the estimated load to a threshold value; and
select the second number of the battery blocks to be lower than the first number of the battery blocks when the estimated load is above the threshold value; and
control coupling of the second number of the battery blocks to the voltage terminals of the battery to set a battery voltage which corresponds to the sum of the block voltages of the second number of the battery blocks.

12. The battery control circuit according to claim 11, wherein the controller is further configured to:
detect the battery voltage; and
perform the selection of the first number of the battery blocks and/or of the second number of the battery blocks depending on the detected battery voltage.

13. The battery control circuit according to claim 11, wherein the controller is further configured to:
detect a charging status of at least one of the battery blocks; and
perform the selection of the first number of the battery blocks and/or of the second number of the battery blocks depending on the detected charging status.

14. The battery control circuit according to claim 11, wherein the controller is further configured to:
detect the block voltage of at least one of the battery blocks; and
perform the selection of the first number of the battery blocks and/or of the second number of the battery blocks depending on the detected block voltage.

15. The battery control circuit according to claim 11, wherein the controller is further configured to:
monitor a fault status of at least one of the battery blocks; and
perform the selection of the first number of the battery blocks and/or of the second number of the battery blocks depending on the determined fault status.

16. The battery control circuit according to claim 11,
wherein the battery blocks are connected in series via a first connection node and a second connection node of at least one of the battery blocks; and
wherein the controller is further configured to:
depending on the at least one battery block being selected, control the coupling to the voltage terminals by switching between configurations of the battery block,
the configurations of the battery block comprising:
a first configuration in which a bypass connection between the first connection node and the second connection node of the battery block is open and the at least one battery cell of the battery block is connected between the first connection node and the second connection node, and
a second configuration in which a bypass connection between the first connection node and the second connection node of the battery block is closed and the at least one battery cell of the battery block is disconnected from at least one of the first connection node and the second connection node of the battery block.

17. The battery control circuit according to claim 16, wherein the controller is further configured to:
control temporary connection of a resistor in series with the battery blocks; and
initiate switching of the at least one the battery block between the first configuration and the second configuration while the resistor is connected in series.

18. The battery control circuit according to claim 16, comprising:
a switching circuit configured to perform the switching between the configurations of the at least one battery block, the switching circuit comprising:
at least one first switch to selectively disconnect the at least one battery cell of the battery block from at least one of the first connection node and the second connection node of the battery block, and
at least one second switch to selectively close the bypass connection between the first connection node and the second connection node of the battery block.

19. The battery control circuit according to claim 16, wherein the at least one battery block further comprises a capacitor connected in parallel to the at least one battery cell of the battery block.

20. The battery control circuit according to claim 16, wherein the at least one battery block comprises a fuse connected in series with the at least one battery cell of the battery block.

21. A battery system comprising:
a first voltage terminal and a second voltage terminal;
a plurality of battery blocks, each of the battery blocks comprising at least one battery cell to provide a block voltage of the battery block;
a controller configured to:
select a first number of the battery blocks;
control coupling the first number of the battery blocks to the voltage terminals to set a battery voltage which corresponds to the sum of the block voltages of the first number of the battery blocks;
select a second number of the battery blocks, wherein to select the second number of the battery blocks comprises to:
estimate a load on the battery;
compare the estimated load to a threshold value; and
select the second number of the battery blocks to be lower than the first number of the battery blocks when the estimated load is above the threshold value; and
control coupling of the second number of the battery blocks to the voltage terminals to set a battery voltage which corresponds to the sum of the block voltages of the second number of the battery blocks.

22. A control circuit for a battery block with at least one battery cell, a first connection node and a second connection node to connect the battery block between a first voltage terminal and a second voltage terminal of a battery, the control circuit comprising:
at least one first switch to selectively disconnect the at least one battery cell of the battery block from at least one of the first connection node and the second connection node of the battery block;
at least one second switch to selectively close a bypass connection between the first connection node and the second connection node of the battery block; and
a control logic configured to generate control signals for the at least one first switch and the at least one second switch to switch between configurations in such a way that when an estimated load on the battery is above a threshold value, the battery block is switched from a first configuration to a second configuration so that a number of battery blocks connected between the first voltage terminal and the second voltage terminal of the battery circuit is decreased, the control logic comprising:
the first configuration in which the bypass connection between the first connection node and the second connection node of the battery block is open and the at least one battery cell of the battery block is connected between the first connection node and the second connection node, and
the second configuration in which the bypass connection between the first connection node and the second connection node of the battery block is closed and the at least one battery cell of the battery block is disconnected from at least one of the first connection node and the second connection node of the battery block.

\* \* \* \* \*